US012209753B2

(12) United States Patent
Ryu et al.

(10) Patent No.: US 12,209,753 B2
(45) Date of Patent: Jan. 28, 2025

(54) DOOR ASSEMBLY AND A COOKING APPLIANCE THEREWITH

(71) Applicant: LG ELECTRONICS INC., Seoul (KR)

(72) Inventors: Siyoung Ryu, Seoul (KR); Dongmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 17/705,055

(22) Filed: Mar. 25, 2022

(65) Prior Publication Data

US 2022/0307698 A1 Sep. 29, 2022

(30) Foreign Application Priority Data

Mar. 26, 2021 (KR) ........................ 10-2021-0039251

(51) Int. Cl.
*F24C 15/02* (2006.01)
*E05C 1/00* (2006.01)
*E05C 1/04* (2006.01)
*H05B 6/64* (2006.01)

(52) U.S. Cl.
CPC ............ *F24C 15/022* (2013.01); *E05C 1/002* (2013.01); *E05C 1/04* (2013.01); *H05B 6/6414* (2013.01)

(58) Field of Classification Search
CPC .......... F24C 15/022; E05C 1/002; E05C 1/04; H05B 6/6141; E05D 11/1007; E05D 11/1014; E05D 11/1021
USPC ........................................................ 121/19 R
See application file for complete search history.

(56) References Cited

U.S. PATENT DOCUMENTS 3,736,398 A * 5/1973 Jarvis ..................... H05B 6/763 219/738
2010/0321882 A1* 12/2010 Tracy .................... G06F 1/1679 361/679.55

FOREIGN PATENT DOCUMENTS

| | | | |
|---|---|---|---|
| CN | 103705136 | A | 4/2014 |
| CN | 104676668 | A | 6/2015 |
| CN | 110318597 | A | 10/2019 |
| CN | 111035235 | A | 4/2020 |
| JP | 2004317071 | A | 11/2004 |
| KR | 10-1995-0019473 | A | 7/1995 |
| KR | 10-1999-0030842 | A | 5/1999 |
| KR | 101587031 | B1 | 1/2016 |

* cited by examiner

*Primary Examiner* — Vivek K Shirsat
(74) *Attorney, Agent, or Firm* — Bryan Cave Leighton Paisner LLP

(57) ABSTRACT

A cooling appliance including a locking mechanism configured to fix the door to the main body at a different position from the latch mechanism, in a state where the door fixed to the main body by the latch mechanism closes the cooking chamber, wherein the locking mechanism provided in the door may include a shaft moved to a fixing position, at which the shaft is coupled to the hinge member, or a releasing position, at which the shaft is released from the coupling state, by a repeated pressing manipulation.

12 Claims, 15 Drawing Sheets

DOOR ASSEMBLY AND A COOKING APPLIANCE THEREWITH

CROSS-REFERENCE TO RELATED APPLICATION

This application claims priority to and the benefit of Korean Patent Application No. 10-2021-0039251, filed on Mar. 26, 2021, the disclosure of which is incorporated herein by reference in its entirety.

BACKGROUND

Technical Field

The present disclosure relates to a cooking appliance, more particularly, to a cooking appliance including a door configured to open and close a cooking chamber.

Background cooking appliance is an electric home appliance for cooking food and installed in a kitchen space to cook food according to a user's intention. Such cooking appliances may be classified in various ways according to heat source, type or fuel.

When classified according to the type of cooking, the cooking appliances may be classified into an open type cooking appliance and a closed type cooking appliance according to the type of space where food is placed. The closed type cooking appliances include ovens and microwaves. The open type cooking appliances include, for example, cook tops.

The closed type cooking appliance shields a space where food is located and cooked by heating the shield space. The closed type cooking appliance includes a chamber provided in a main body as a space in which food is placed and the chamber is closed to cook the food (i.e., a cooking chamber). The cooking chamber may be the space where the food is cooked. A heating source is provided inside or outside the cooking chamber to heat the cooking chamber.

A microwave oven is an example of a closed type cooking appliance that is configured to generate microwaves using electricity to penetrate a cooking object placed in the cooking chamber and heat the cooking object by causing molecular motion therein.

The microwave oven cooking appliance is configured to irradiate a high frequency of a magnetron to the food to heat the inside the outside at the same time. Since it has high thermal efficiency, the microwave oven may significantly shorten the cooking time of food and reduce the loss of nutritional value in the process of the cooking, thawing and reheating of the food, and also enable direct cooking of the food stored in the container.

The microwave oven typically includes a door for opening and closing the cooking chamber provided in the main body. The microwave oven door may be a left-right opening/closing door, a vertical opening/closing door, a sliding door, etc., based on the opening/closing method. The most commonly used door is the left-right opening/closing door.

A latch may be provided between the main body and the door to selectively secure the door for opening/closing the cooking chamber. The latch operates as a hook to maintain the closed state of the door and detects the closed state of the door to prevent the cooking from proceeding in the open state of the door.

Conventionally, the latch may not secure the door from being fully open. Specifically, if a predetermined force is applied to the closed door, the locked state of the door by the latch may be released without any other manipulation. Accordingly, the door may rotate or slide to open the cooking chamber.

Due to the opening and closing structure of the door, the door can be easily opened when the user pulls the door handle. Accordingly, the cooking chamber may be mistakenly and inadvertently opened during the operation of the microwave oven.

If the cooking chamber is unintentionally opened during the operation of the microwave, there is a risk that the user might be injured (e.g., burns) due to the heat inside the cooking chamber in which food is being cooked. In addition, if the door is frequently opened and closed—even while cooking is not in progress—the latch may wear out quickly, and the door opening/closing operation becomes unstable due to the worn latch.

Accordingly, an object of the present disclosure is to address at least the above-noted problems. Embodiments of the present disclosure provide a cooking appliance having an improved structure configured to enhance reliability of door securing to prevent unintentional opening of a cooking chamber.

Further, embodiments of the present disclosure may also provide a cooking appliance having an improved structure to easily and conveniently secure the door or release the secured state of the door.

SUMMARY

To achieve these objects and other advantages and in accordance with the disclosure, as embodied and broadly described herein, there is provided a cooking appliance including a locking mechanism configured to fix the door to the main body at a different position from the latch mechanism, in a state where the door fixed to the main body by the latch mechanism closes the cooking chamber, so that the locking mechanism provided in the door may change a fixing state between the door and the main body according to the repeated pressing manipulation.

Accordingly, the fixing of the door may be made with high reliability, and the fixing and releasing of the door may be easily and conveniently performed only by repeating the pressing manipulation on the locking mechanism.

In another embodiment of the present disclosure, the locking mechanism provided in the door may include a shaft moved to a fixing position, at which the shaft is coupled to the hinge member, or a releasing position, at which the shaft is released from the coupling state, by the repeated pressing manipulation.

In one embodiment of the present disclosure, a cooking appliance may include a main body in which a cooking chamber is formed and having an open front surface; a hinge member disposed on one side in a predetermined lateral-direction area of the main body; a door rotatably coupled to the hinge member in front of the main body and configured to open and close the cooking chamber; a latch mechanism provided in the door and configured to fix the door to the main body by engaging with the main body on the other lateral-direction side of the main body; and a locking mechanism configured to fix the door to the main body at a different position from the latch mechanism, in a state where the door fixed to the main body by the latch mechanism closes the cooking chamber, wherein the locking mechanism provided in the door may a shaft moved to a fixing position, at which the shaft is coupled to the hinge member, or a releasing position, at which the shaft is released from the coupling state, by the repeated pressing manipulation.

The locking mechanism may include a holder provided in the door and comprising a predetermined space for accommodating the shaft; a shaft inserted in the holder to be moved to the fixing position or the releasing position; a locking protrusion protruded toward an inner circumferential surface of the holder from an outer circumferential surface of the shaft opposite to the inner circumferential surface of the holder; an engaging protrusion provided in the inner circumferential surface of the holder and configured to engage with the locking protrusion at a first position or a second position; a push button movably provided in the holder and configured to move the shaft based on the pressing manipulation to move the locking protrusion to the first position or the second position and an elastic member configured to elastically support the shaft in a direction which the engagement between the engaging protrusion and the locking protrusion is made.

When the engaging protrusion engages with the locking protrusion at the first position, the shaft may be fixed at the fixing position, and when the engaging protrusion engages with the locking protrusion at the second position, the shaft may be fixed at the releasing position.

The holder may include a first holder accommodating a part of the shaft and coupled to the door, having a lower portion that is open toward the hinge member; and a second holder provided over the first holder and coupled to the first holder, and accommodating the other part of the shaft and a predetermined area of the push button, having the engaging protrusion.

The engaging protrusion may include a first fixing protrusion protruded from an inner circumferential surface of the second holder to engage with the locking protrusion at the first position in a vertical direction; and a second fixing protrusion from the inner circumferential surface of the second holder to engage with the locking protrusion at the second position in a vertical direction, and the first fixing protrusion and the second fixing protrusion may be alternately disposed in a circumferential direction of the second holder.

The push button engaging with the second fixing protrusion in the vertical direction may engage with the locking protrusion and the locking protrusion may be fixed at the second position in the process of the vertical engagement between the push button and the locking protrusion, and vertical positions of the first position and the second position may be different from each other.

The push button may include a guide protrusion protruded from an outer circumferential surface of the push button opposite to the second holder in a centripetal force direction, and the second holder comprises a guide groove provided under the second fixing protrusion and recessed from an inner circumferential surface of the second holder in a centrifugal force direction, and the guide groove may guide vertical movement of the guide protrusion engaging with the guide groove.

The second fixing protrusion provided over the guide groove may interfere with the guide protrusion to fix the vertical position of the push button, and the vertical position of the locking protrusion may be fixed at the second position as a lower end of the push button engages with an upper end of the locking protrusion in the vertical direction.

An installation hole may be vertically formed through an upper surface of the door to insert the holder therein, and the holder may be inserted in the installation hole and fitted to the door, thereby coupling the door to the locking mechanism, and the locking mechanism may be coupled to the upper area of the door to integrally move with the door in the direction of rotation of the door.

A projected portion may be provided between the upper surface of the door and the hinge member and exposed from an inner circumferential surface of the door surrounding the installation hole toward the installation hole, and the holder may further include a first protrusion and a second protrusion that are protruded from an outer circumferential surface of the holder, and the projected portion may be fitted between the first protrusion and the second protrusion that are spaced apart in the vertical direction and the vertical movement of the first holder may be restricted.

The second protrusion may be disposed under the first protrusion and formed in a hook-like shape having a lower inclined surface.

The shaft may be movable in the holder, and at least predetermined part of the shaft may be protruded outside the holder at the fixing position to be coupled to the hinge member.

The hinge member may include a fixed portion fixed to a front surface of the main body; a hinge portion extending from the fixed portion toward the door and to which the door rotatably is coupled; and a through-hole portion provided between the fixed portion and a coupling point between the hinge portion and the door and vertically formed through the hinge member.

At least predetermined part of the shaft located at the fixing position may pass the hinge member through the through-hole portion in the vertical direction.

The rotation of the door may be restricted by the interference between at least predetermined part of the shaft located at the fixing position and a lateral surface of the hinge portion opposite to the shaft.

The above exemplary embodiments provide several advantages. One advantage, for example, is that the door of the cooking appliance may be maintained in the closed state by the locking mechanism configured to fix the door to the main body, so that the fixing of the door can be performed with high reliability. Accordingly, it may be possible to effectively prevent the unintentional opening of the cooking chamber during the operation of the cooling appliance.

Another advantage, for example, is that the cooking appliance may allow the position of the shaft to be changed to the fixing position or the releasing position only by repeating the pressing manipulation on the locking mechanism. The cooking appliance may have an advantageous effect of allowing the door to be fixed and released easily and conveniently, thereby preventing the unintentional opening of the cooking chamber.

Another advantage, for example, is that the door may be fixed and released easily and conveniently, and the unnecessary opening and closing of the door may be suppressed. Accordingly, the door opening and closing operation may be effectively suppressed from being unstable due to an abnormally rapidly worn latch mechanism.

BRIEF DESCRIPTION OF DRAWINGS

The accompanying drawings constitute a part of this specification and illustrate an embodiment of the present disclosure and together with the specification, explain the present disclosure.

DETAILED DESCRIPTION OF THE DISCLOSURE

Figure 1:
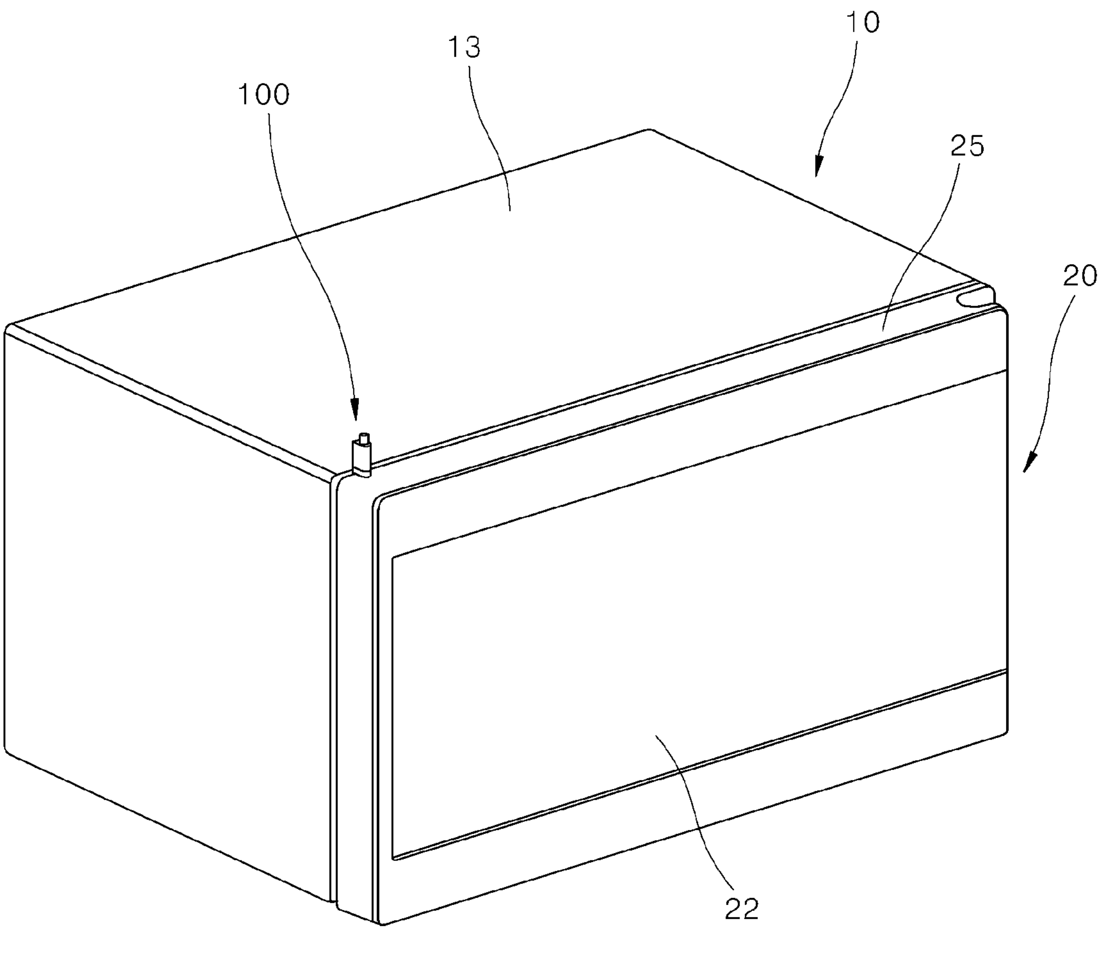
FIG. 1 is a perspective diagram showing a cooking appliance according to an embodiment of the present disclosure.

Reference will now be made to the exemplary embodiments illustrated in the drawings, and specific language will be used here to describe the same. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

It will be understood that although the terms first, second, etc. may be used herein to describe various elements, these elements should not be limited by these terms. These terms are generally only used to distinguish one element from another.

The present disclosure is not intended to limit the embodiments and drawings set forth herein, and numerous other modifications and embodiments can be devised. In the disclosure, detailed descriptions of known technologies in relation to the disclosure are omitted to make the present disclosure understood clearly. In the drawings, identical reference numerals can denote identical or similar components.

The above-described aspects, features and advantages are specifically described hereunder with reference to the accompanying drawings such that one having ordinary skill in the art to which the present disclosure pertains easily can implement the technical spirit of the disclosure.

Terminology used in the present disclosure is only to describe a specific embodiment or implementation, not intended to limit the present disclosure. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

The terms "first", "second" and the like are used herein only to distinguish one component from another component. Thus, the components should not be limited by the terms. Certainly, a first component can be a second component unless stated to the contrary.

It will be understood that when an element is referred to as being "connected with" another element, the element can be directly connected with the other element or intervening elements may also be present. In contrast, when an element is referred to as being "directly connected with" another element, there are no intervening elements present.

Hereinafter, expressions of 'a component is provided or disposed in an upper or lower portion' may mean that the component is provided or disposed in contact with an upper surface or a lower surface, and also it may mean that other elements are provided between the components and on the component or beneath the component.

The present disclosure is not intended to limit the embodiments and drawings set forth herein, and numerous other modifications and embodiments can be devised. In the disclosure, detailed descriptions of known technologies in relation to the disclosure are omitted to make the present disclosure understood clearly. In the drawings, identical reference numerals can denote identical or similar components.

In a state where a cooking appliance is placed on the floor, the direction in which the door is installed with respect to the center of the cooking appliance may be defined as the front direction. Therefore, the direction in which the user opens the door to enter the food may be the rear direction. For convenience, the front-rear direction may be a first direction, so that the front direction may be one direction of the first direction and the rear direction may be the other direction of the first direction.

In addition, the direction of gravity may be defined as downward and the direction opposite to gravity may be defined as upward.

A horizontal direction orthogonal to the front-rear direction of the cooling appliance, that is, a width direction of the cooking appliance when looking at the cooking appliance from the front of the door provided in the cooking appliance, may be a left-right direction.

A width direction of the cooking appliance may be referred to as a lateral direction. If then, the right side may be referred to as one side of the lateral direction, and the left side may be referred to as the other side of the lateral direction.

The above-noted vertical direction may be referred to as a third direction. Then, the upward direction may be one direction of the third direction and the downward direction may be the other direction of the third direction.

The above-noted up-down direction may be referred to as a vertical direction. Then, the front-rear direction and the left-right direction (including the first direction and the second direction) may be referred to as a horizontal direction.

In the present disclosure, when referring to "A and/or B", it means A, B or A and B unless otherwise stated. When referring to "C to D", it means that it is C or more and D or less unless otherwise stated.

Overall Structure of Cooking Appliance

Figure 2:
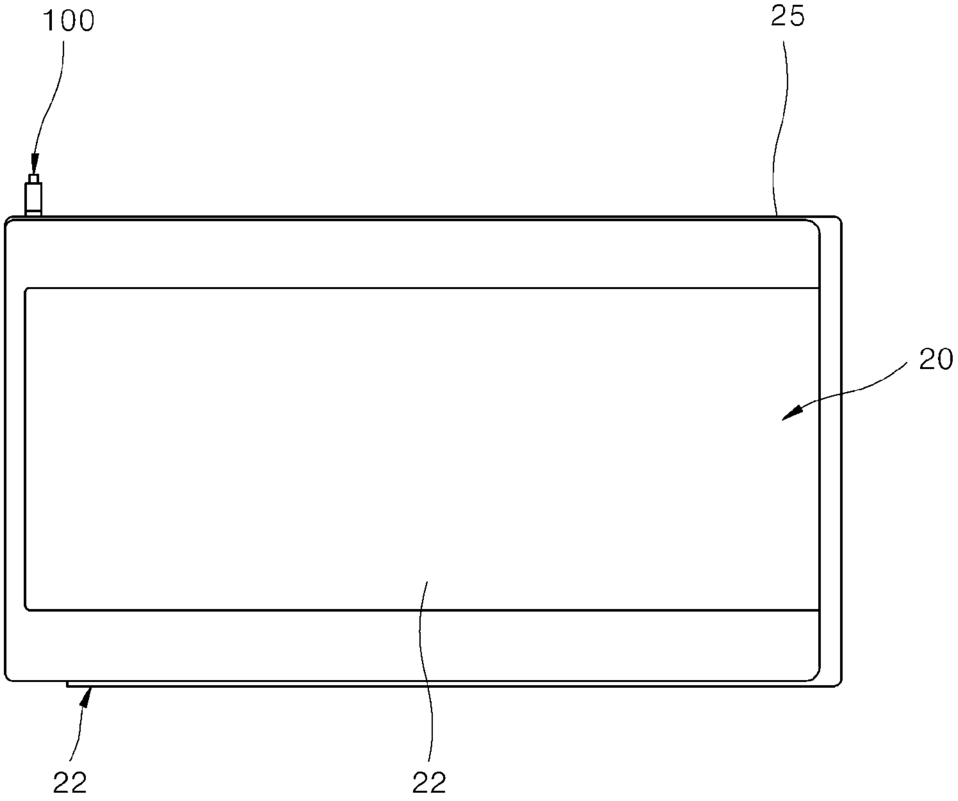
FIG. 2 is a front view of the cooking appliance shown in FIG. 1.
Figure 3:
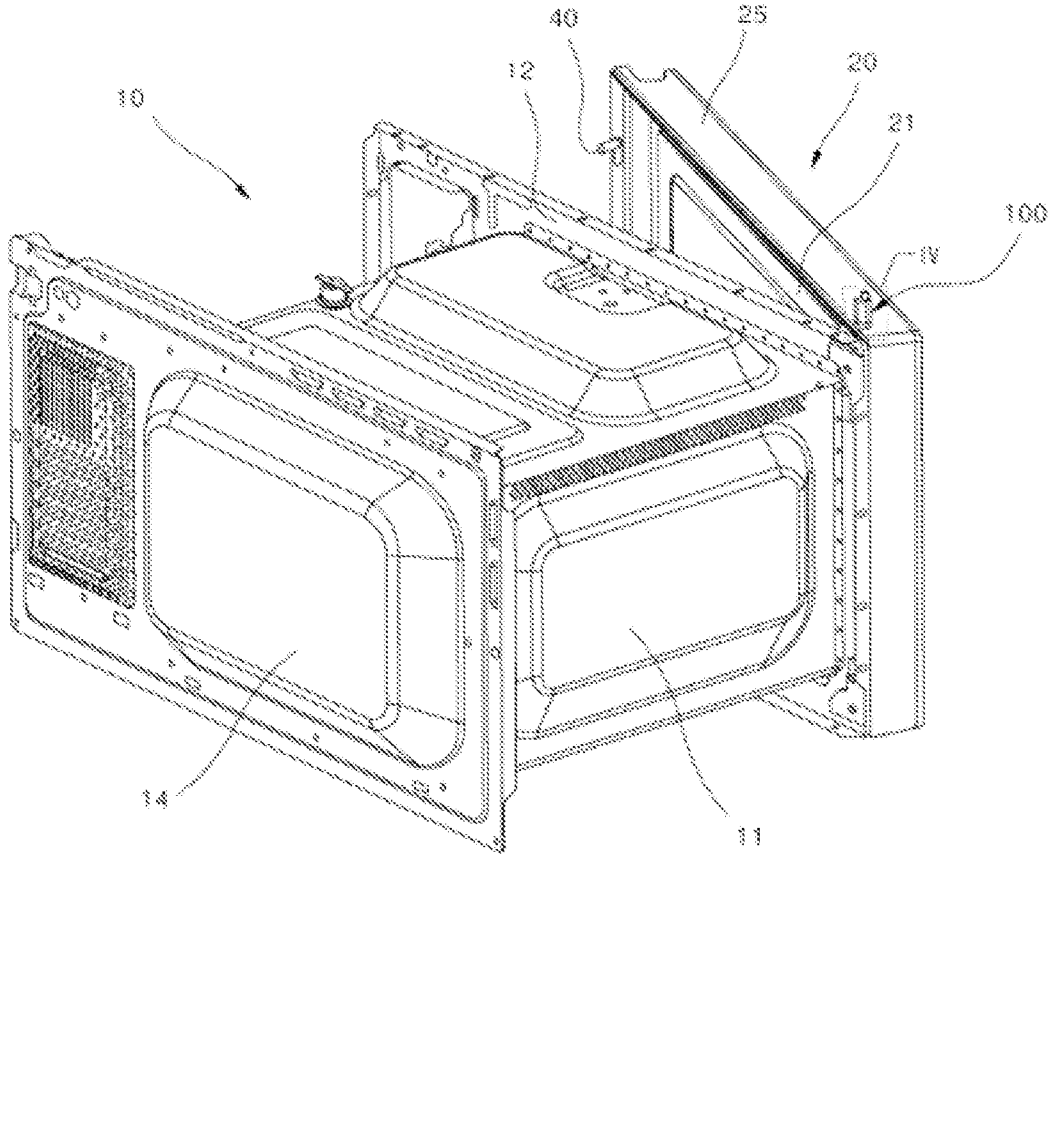
FIG. 3 is a rear perspective view of the cooking appliance shown in FIG. 1.

FIG. 1 is a perspective diagram showing a cooking appliance according to one embodiment of the present disclosure. FIG. 2 is a front view of the cooking appliance shown in FIG. 1. FIG. 3 is a rear perspective view of the cooking appliance shown in FIG. 1.

Referring to FIGS. 1 to 3, the cooking appliance according to an embodiment of the present disclosure may include a main body 10 defining the exterior design. The main body 10 may be provided in a substantially rectangular parallelepiped shape. The main body 10 may include a cavity 11 and a cabinet 13. The main body 10 may be made of a material having a predetermined strength in order to protect a plurality of parts provided in an inner space thereof.

The cavity 11 may form an inner frame of the main body 10 and it may be formed in a hexahedron with an open front side. A cooking chamber may be formed in the cavity 11. The cooking chamber may be formed in a shape corresponding to the internal shape of the cavity 11, that is, for example, a hexahedron shape, such as a cube, with an open front side.

The cooking chamber may be formed in the hexahedron shape with the open front side. While the cooking chamber is closed, the inner space of the cooking chamber may be heated to cook the food. In other words, the inner space of the cooking chamber provided in the cooking appliance may be the space in which food is heated or cooked.

The cabinet 13 may define the exterior design of the main body 10. The cabinet 13 may form the exterior of the main body 10 while covering the cavity 11 from the top and sides.

In this example, a front plate 12 may be provided at the front side of the cavity 11 and a rear plate 14 may be provided at the rear side of the cavity 11.

The front plate 12 may define the front exterior of the main body 10 at the front side of the cavity 11. As one example, the front plate 12 may be provided in the form of a hollow metal plate.

Such the cavity 11 and the cabinet 13 defining the exterior of the main body 10 may be provided.

The cavity 11 may include a frame 11 forming left and right side surfaces and an upper side surface; a base 12 provided at a lower portion of the frame 11 and forming a bottom of the main body 100; a rear plate 13 provided at a rear portion of the frame 11 and forming a rear surface of the main body 10; and a front plate 14 provided at a front portion of the frame 11 and forming a front surface of the main body 10. An opening may be formed in the front plate 14 to open the front portion of the cooking chamber 15.

The cooking chamber may be formed inside the main body 10. The cooking chamber may be made in the form of a hexahedron with an open front. While the cooking chamber is closed, the inner space of the cooking chamber may be heated to heat or cook food. In other words, the inner space of the cooking chamber may be the space in which food is cooked.

A door 20 may be rotatably coupled to the front of the main body 10 to open and close the cooking chamber. The door 20 may open and close the cooking chamber in a side-swing manner in which the other side in the lateral direction rotates left and right with respect to one side in the lateral direction.

The door 20 may be formed in a hexahedral shape. The door may be formed having a predetermined thickness as a whole. A hinge member 30 may be provided between the main body 10 and the door. The hinge member 30 may rotatably couple the lateral one side of the door 20 to the main body 10. The door 20 may be rotatably coupled to the front surface of the main body 10 by the hinge member 30 and rotate on the hinge member to open and close the cooking chamber.

A cooking chamber heat source may be provided in the main body 10 to heat the inner space of the cooking chamber. The heat source may include one or more heat sources.

In this example, the cooking chamber heat source may include a magnetron configured to supply a high-frequency heat source the inner space of the cooking chamber. The magnetron may be provided inside of the main body 10, specifically, at an upper area of the cooking chamber. However it is understood that the location of the magnetron heat source is not limited thereto.

An electrical control portion may be formed in the main body 10, specifically, an upper or side area of the cooking chamber provided in the main body 10. Electrical components including a magnetron and a high voltage transformer may be installed in the electrical portion.

Structure of Door

The door 20 may include a door panel 21 for forming a frame of the door 20. The door panel 21 may be formed in a hexahedral shape corresponding to the front shape of the main body 10. A window 22 may be formed through the door panel 21 to make the inner space of the cooking chamber 15 visible from outside the door 20. The door panel 21 may be made of a metal material having a predetermined strength.

A door frame 25 may be provided in an outer surface of the door panel 21. The door frame 25 may define a front surface, an upper surface, a bottom surface and a lateral surface, that is, the exterior of the door 20. The door panel 21 may be formed in a hexahedral shape having an open rear surface. The door panel 21 may be accommodated in the door frame 25.

A hinge member 30 may be provided at one lateral side of the door panel 21 to rotatably couple the door panel 21 to the main body 10. The hinge member 30 may be installed in each of lateral-direction upper and lower ends of the door panel 21. The door panel 21 may open and close the cooking chamber 15 in a side-swing manner in which the other side in the lateral direction is rotated left and right with respect to one side in the lateral direction coupled to the body by the hinge member 30.

The cooking appliance may further include a latch mechanism 40. In this embodiment, the latch mechanism 40 may be provided in the door 20. The latch mechanism 40 installed in the door 20 may be inserted in the main body 10 through a latch slot (not shown) formed through the front surface of the main body 10, when the door 20 closes the cooking chamber airtight. Hence, the latch mechanism 40 inserted into the main body 10 may engage with a locking lever (not shown) provided in the main body 10 to selectively couple the door 20 to the main body 10.

The rotation of the door 20 may be limited by the action of the latch mechanism 40, so that the closed state of the cooking chamber closed by the door 20 may be maintained. It may be possible to detect whether the door is closed or not based on the operation of detecting whether the latch mechanism 40 and the latch lever are engaged. Accordingly, the operation of the cooking appliance may be controlled so that heating may not proceed in a state in which the door 20 is open.

Figure 4:
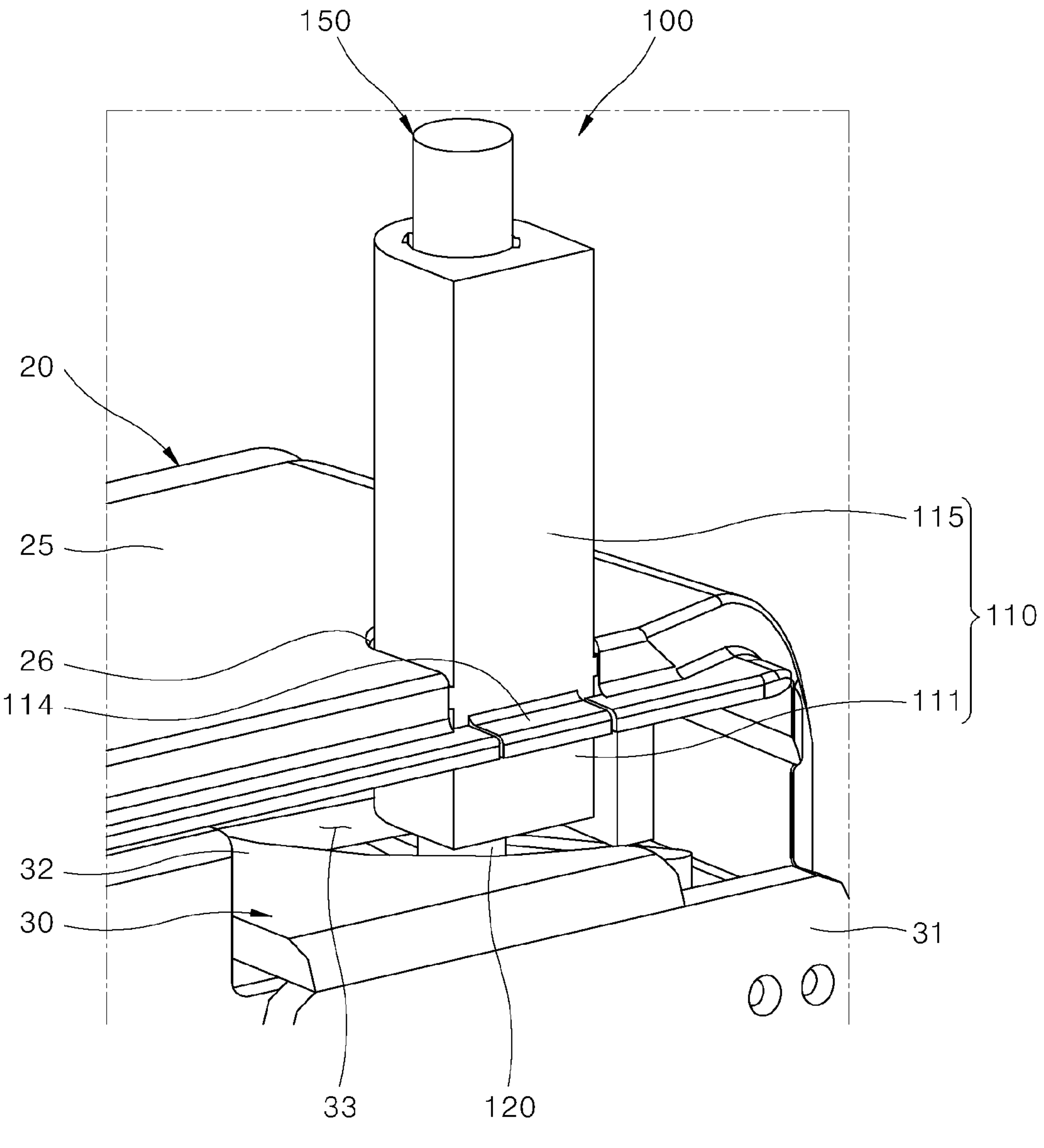
FIG. 4 is an enlarged view of "IV" shown in FIG. 3.

FIG. 4 is an enlarged view of "IV" shown in FIG. 3. Referring to FIGS. 1 to 4, a locking mechanism 100 may be provided in the door 20. The locking mechanism 100 may couple the door 20 to the main body 10 separately from the latch mechanism 40. Such the locking mechanism 100 couple the door 20 fixed by the latch mechanism 40 in the state of closing the cooking chamber to the main body 10. However, the locking mechanism 100 may couple the door 20 to the main body 10 in a different position separately from the latch mechanism 40.

For example, the latch mechanism 40 and the locking mechanism 100 may be provided at opposite lateral ends of the door 20. Thus, as shown in FIG. 4, the latch mechanism 40 may be provided at one lateral-direction side of the door 20 and the locking mechanism 100 may be provided at the opposite lateral-direction side of the door 20. In this instance, the latch mechanism 40 may serve to secure the door 20 to the main body 10 on one lateral-direction side of the door 20 and the locking mechanism 100 may serve to secure the door 20 to the main body 10 on the other lateral-direction side of the door 20.

Overall Structure of Locking Member

Figure 5:
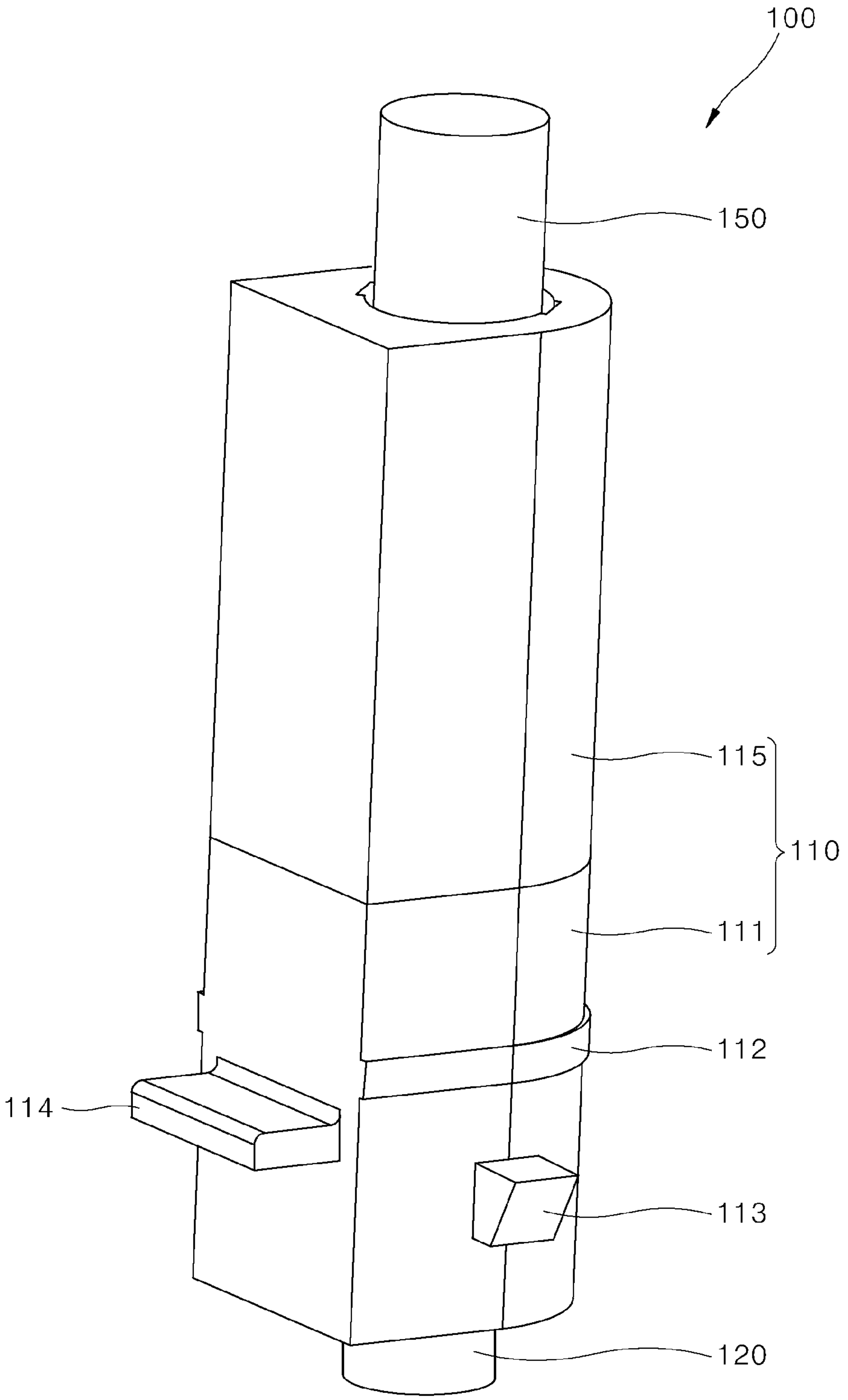
FIG. 5 is a perspective view of a locking mechanism separated from FIG. 4.
Figure 6:
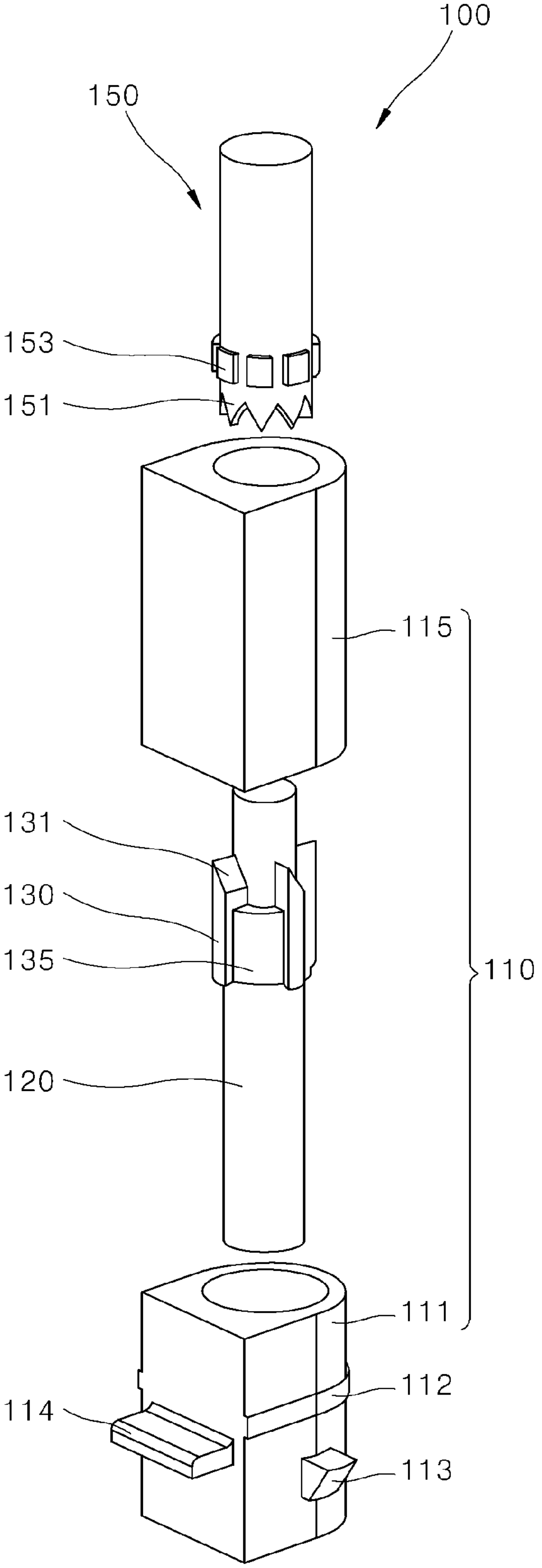
FIG. 6 is an exploded perspective view of the locking mechanism shown in FIG. 5.
Figure 7:
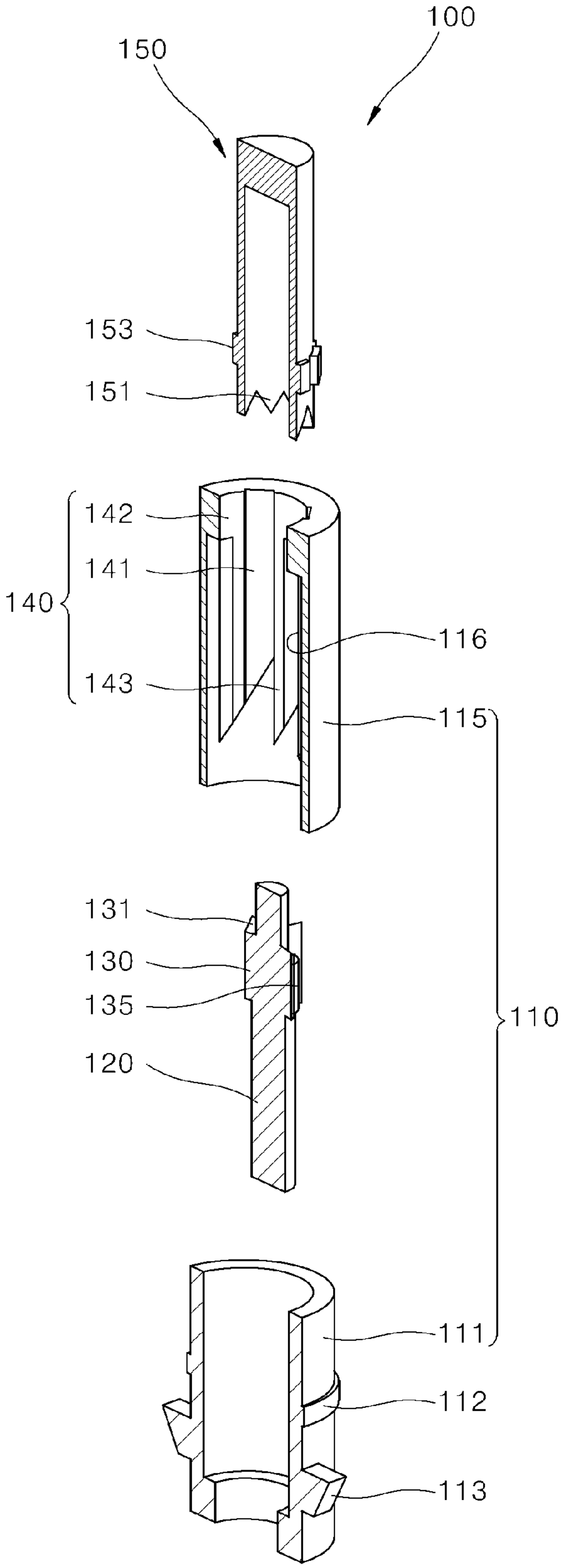
FIG. 7 is a sectional view showing an internal structure of the locking mechanism shown in FIG. 6.

FIG. 5 is a perspective view of a locking mechanism separated from FIG. 4. FIG. 6 is an exploded perspective view of the locking mechanism shown in FIG. 5. FIG. 7 is a sectional view showing an internal structure of the locking mechanism shown in FIG. 6.

Referring to FIGS. 4 to 7, the locking mechanism 100 may include a holder 110 and a shaft 120.

The holder 110 may be provided in the door 20 and accommodate the shaft 120 to support the shaft 120. A predetermined space may be formed in the holder 110 to accommodate the shaft 120. The holder 110 may accommodate the shaft 120 therein, while supporting the shaft 120 to be lifted.

The holder 110 may include a first holder 111 and a second holder 115. Specifically, the holder 110 may have the first holder 111 and the second holder 115 that are detachably coupled to each other in the vertical direction.

The first holder 111 may define a lower portion of the holder 110 and be disposed under the second holder 115. Such the first holder 111 may be coupled to the door while accommodating a portion of the shaft 120 (e.g., a lower portion of the shaft 120). The lower portion of the first holder 111 may be open toward the hinge member 30.

A predetermined space for accommodating some area of the lower portion of the shaft 120 may be formed in the first holder 111. The lower portion of the first holder 111 may be formed to penetrate in the vertical direction so that the space inside the first holder 111 may be open toward the hinge member 30.

The second holder 115 may define an upper portion of the holder 110 and it may be disposed on the first holder 111. The second holder 115 may be coupled to the first holder 111 on the upper portion of the first holder 111 and it may accommodate the other portion of the shaft 120 (e.g., the other portion of the shaft 120 except the predetermined lower portion of the shaft 120). Also, the second holder 115 may accommodate at least predetermined portion of a push button 150 which will be described later, together with the shaft 120.

The shaft 120 may be secured to the holder 110 to be liftable. The shaft 120 may be lifted based on the manipulation of the push button 150. The position of the lifted shaft 120 may be changed to a fixed position Pa (referring FIG. 8) or a released position Pb (referring FIG. 9).

The fixed position Pa refers to the position of the shaft 120 when coupled to the hinge member 30. The released position Pb refers to the position of the shaft 120 at which the coupling to the hinge member 30 is released.

The shaft 120 may be lifted according to the manipulation of the push button 150. The position of the lifted shaft 120 may be changed to the fixed position Pa at which the hinge member 30 and the shaft 120 are coupled together and the released position Pb at which the coupling is released.

The locking mechanism 100 may further include a locking protrusion 130. The locking protrusion 130 may protrude from an outer circumferential surface of the shaft 120 facing an inner circumferential surface of the holder 110 toward an inner circumferential surface of the holder 110. In other words, the locking protrusion 130 may project from the outer circumferential surface of the shaft 120 in a centrifugal force direction.

For example, as shown, a plurality of locking protrusions 130 may be spaced apart a predetermined distance from each other along the circumferential direction of the shaft 120. The distance between the locking protrusions may be set to correspond to a distance between first securing protrusions 141 of an engaging protrusion 140 which will be described later.

A connecting protrusion 135 may be provided between the locking protrusions 130. The connecting protrusion 135 may connect two adjacent locking protrusions 130 and support the lateral area of the locking protrusion 130. The connecting protrusion 130 may be protruded from the outer circumferential surface of the shaft 120. The connecting protrusion 130 may protrude less than the engaging protrusion 130 in the centrifugal force direction and the upper direction, such as shown in exemplary FIG. 6.

The locking mechanism 100 may further include an engaging protrusion 140. The engaging protrusion 140 may be provided at an inner circumferential surface of the holder 110 to engage with the locking protrusion 130 at a first position P1 or a second position P2.

The first position P1 may be a position at which the locking protrusion 130 and the engaging protrusion 140 are engaged. Specifically, the first position P1 may be referred to as the position at which the locking protrusion 130 and the engaging protrusion 140 engage with each other to couple the shaft 120 to the fixed position Pa.

The second position P2 may be a position at which the engaging protrusion 140, the push button 150 and the locking protrusion 130 engage with each other. Specifically, the engaging protrusion 140, the push button 150 and the locking protrusion 130 engage with each other to couple the shaft 120 to the released position Pb.

The engaging protrusion 140 may be provided at the inner circumferential surface of the holder 110, specifically, the inner circumferential surface of the second holder 115. The engaging protrusion 140 may include a first fixing protrusion 141 and a second fixing protrusion 142.

The first fixing protrusion 141 may be protruded in a centripetal force direction from the inner circumferential surface of the second holder 115 so as to vertically engage with the locking protrusion 130 at the first position P1.

The second fixing protrusion 142 may be protruded in a centripetal force direction from the inner circumferential surface of the second holder 115 so as to vertically engage with the locking protrusion 130 at the second position P2.

The first fixing protrusion 141 and the second fixing protrusion 142 may be arranged along a circumferential direction of the second holder 115. Specifically, the first fixing protrusion 141 and the second fixing protrusion 142 may be alternately disposed in the circumferential direction of the second holder 115.

The locking mechanism 100 may further include a push button 150. The push button 150 may be movably provided in the holder 110. Specifically, the push button 150 may be vertically movable in the second holder 115. The push button 150 may be moved by the pushing manipulation to move the shaft 120.

A guide protrusion 153 may be provided in the push button 150. A guide groove 116 may be formed in the second holder 115, corresponding to the guide protrusion 153.

The guide protrusion 153 may be protruded from an outer circumferential surface of the push button 150 facing the inner circumferential surface of the second holder 115. In this example, a plurality of guide protrusions 153 may be provide along the circumferential direction of the push button 150, spaced apart a predetermined distance from each other.

The guide groove 116 may be recessed from the inner circumferential surface of the second holder 115 in the centrifugal force direction. The guide protrusion may engage with the guide groove 116.

The guide groove 116 may guide the moving of the guide protrusion 153, while engaging with the guide protrusion 153. Specifically, the guide groove 116 may engage with the guide protrusion 153 to move the guide protrusion 153 only along the vertical direction.

The guide groove 116 may be disposed between the first fixing protrusions 141, while disposed under the second protrusion 142. As one example, the first fixing protrusion 141 and the guide groove 116 may be alternately disposed in the circumferential direction of the second holder 115, and the guide groove 116 may be downwardly extended from a lower end of the second fixing protrusion 152.

The length of the guide groove 116 may be equal to that of the guide protrusion 153 along the circumferential direction of the second holder 115. The guide groove 116 may be vertically extended to guide the vertical motion of the guide protrusion 153.

For example, the push button 150, more specifically, the guide protrusion 153, may engage with the second fixing protrusion 142 in the vertical direction. Specifically, a lower end of the second fixing protrusion 142 may engage with an upper end of the guide protrusion 153, to perform the engaging between the second fixing protrusion 142 and the guide protrusion 153.

The engaging between the second fixing protrusion 142 and the guide protrusion 153 may be performed as described above. Accordingly, the locking protrusion 130 may engage with the lower end of the push button 150, specifically, teeth of a first tooth portion 151 which will be described later, in a state where the vertical position of the push button 150 is fixed, so that the locking protrusion 130 may be fixed to the second position P2.

In this example, the vertical positions of the first position P1 and the second position P2 may be set to be different from each other.

For example, the lower surface of the first fixing protrusion 141 and the upper surface of the locking protrusion 130 may be in contact with each other in the vertical direction, and the first fixing protrusion 141 and the locking protrusion 130 may engage with each other. Also, the lower surface of the push button 150 and the upper surface of the locking protrusion 130 may be in contact in the vertical direction, and the push button 150 and the locking protrusion 130 may engage with each other. The vertical position of the lower surface of the first fixing protrusion 141 and the vertical position of the lower surface of the push button 150 fixed in position by the engaging between the second fixing protrusion 142 and the guide protrusion 153 may be set to be different from each other. Accordingly, the lower surface of the first fixing protrusion 141 may be positioned lower than the lower surface of the second fixing protrusion 142.

An intermediate protrusion 143 may be disposed between the first fixing protrusion 141 and the second protrusion 142. The intermediate protrusion 143 may be protruded from the inner circumferential surface of the second holder 115 in the centripetal force direction, similar to the first fixing protrusion 141 and the second fixing protrusion 142.

For example, a lower surface of the intermediate protrusion 143 may be positioned lower than the lower surfaces of the first and second fixing protrusions 141 and 142. Specifically, the intermediate protrusion 143 may be provided between the first fixing protrusion 141 and the second fixing protrusion 142 and formed in a shape that protrudes further in the lower direction than the first fixing protrusion 141 and the second fixing protrusion 142.

Accordingly, in order for the locking protrusion 140 engaging with the first fixing protrusion 141 to move toward the second fixing protrusion 142, to the locking protrusion 140 must move downward and jump over the intermediate protrusion 143. Specifically, as long as an additional pressing manipulation is not formed in a state where the locking protrusion 130 and the first fixing protrusion 141 are engaging with each other, the engagement state between the first fixing protrusion 141 and the locking protrusion 130 may be stably maintained.

The push button 150 may be moved downward by the pressing manipulation to move the shaft 120 so that the shaft 120 can move the locking protrusion 130 to the first position P1 or the second position P2.

For example, when the pressing manipulation for the push button 150 is performed, the locking protrusion 130 engaging with the first fixing protrusion 141 at the first position P1 may be moved downward. While moved downward, the locking protrusion 130 may jump over the intermediate protrusion 143 and move toward the second fixing protrusion 142. The locking protrusion 130 having moved toward the second fixing protrusion 142 may be engaged with the second fixing protrusion 142 at the second position P2.

When the pressing manipulation for the push button 150 is performed again in this state, the locking protrusion 130 engaged with the second fixing protrusion 142 at the second position P2 may move downward toward the first fixing protrusion 141. Accordingly, the locking protrusion 130 moved toward the first fixing protrusion 141 may be engaged with the first fixing protrusion 141 at the first position P1.

Meanwhile, toothed portions may be provided at the opposite ends of the push button 150 and the locking protrusion 130, respectively. As one example, a first toothed portion 151 may be provided in the lower end of the push button 150 and a second toothed portion 131 may be provide in an upper end of the locking protrusion 130.

Figure 10:
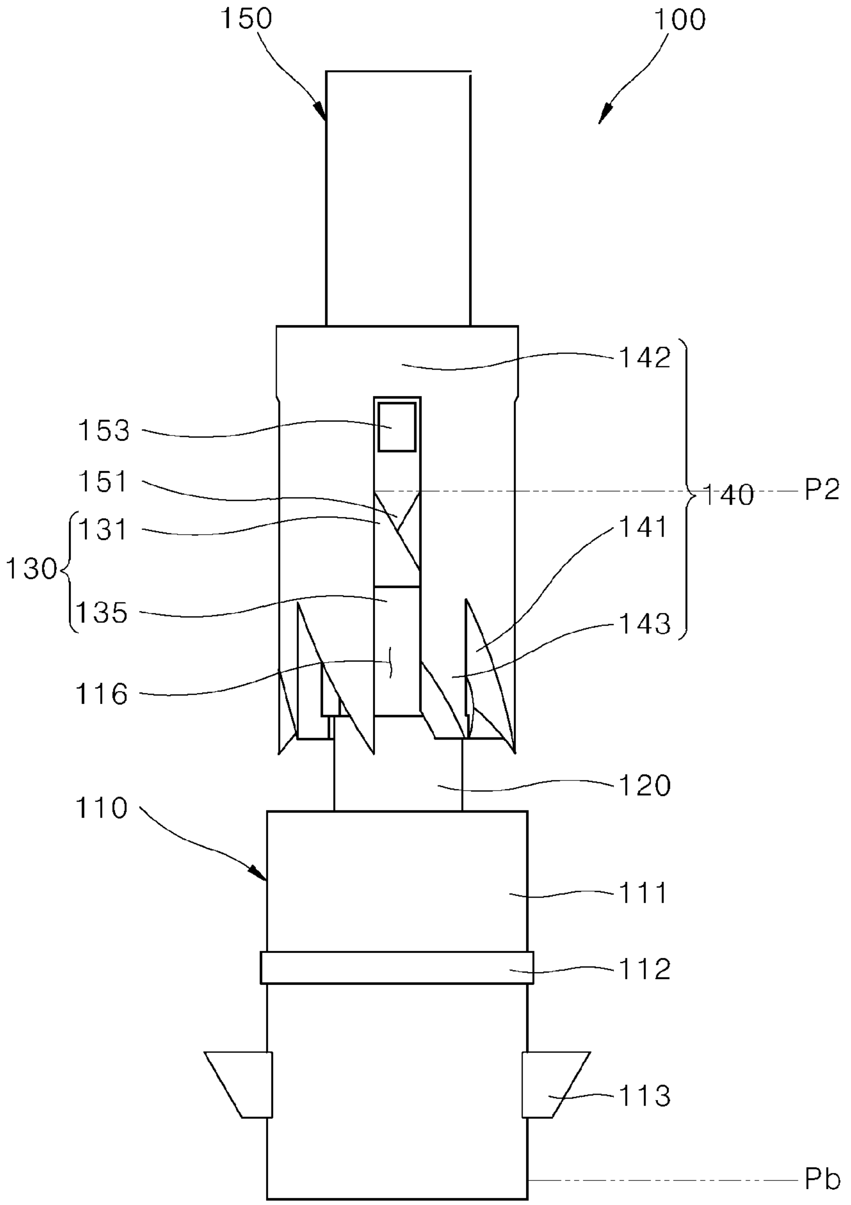
FIG. 10 shows a state where an engaging protrusion is engaging to a locking protrusion in the locking mechanism shown in FIG. 9.
Figure 11:
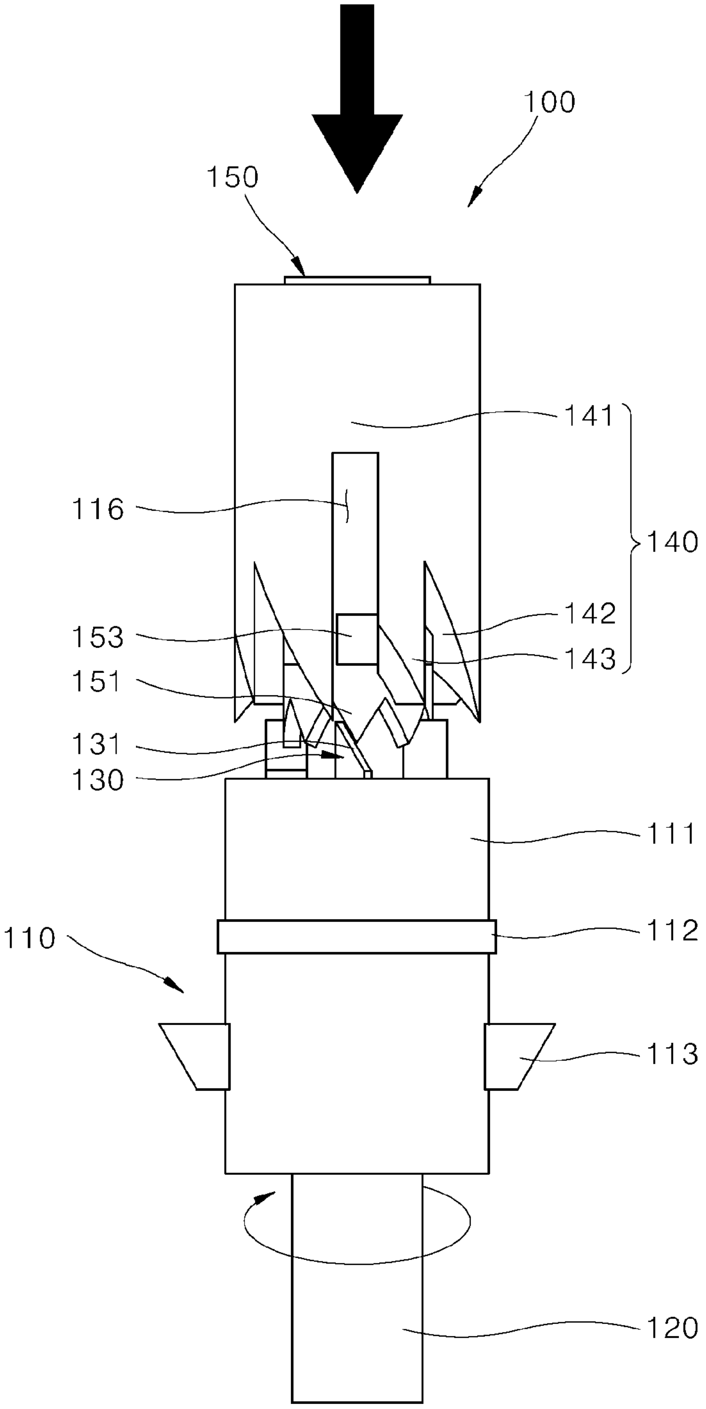
FIGS. 11 and 12 show a state where a manipulation of pushing a push button is performed in the locking mechanism shown in FIG. 10.

A plurality of teeth may be provided in the first toothed portion 151 along a circumferential direction of the push button 150. Each of the teeth may be protruded in the lower direction. Teeth may be protruded in the upper direction from the upper end of the locking protrusion 130, such as shown in FIGS. 10 and 11.

The teeth provided in the second toothed portion 131 may vertically engage with the teeth provided in the first toothed portion 151. In the process of the push button 150 pushing down the locking protrusion 130 and the shaft 120, the teeth of the first toothed portion 151 may move along the inclined surface of the second toothed portion 131 in the downward direction to engage with the teeth of the second toothed portion 131.

When the shaft 120 is moved in the downward direction, the first toothed portion 151 and the second toothed portion 131 may move away from each other and the engagement between them may be then released. When the shaft 120 is moved in the upward direction again, the engagement between the first toothed portion 151 and the second toothed portion 131 may be made again.

That is, when the pressing manipulation for the push button 150 is repeated, the alternating engagement and disengagement between the first toothed portion 151 and the second toothed portion 131 may be repeatedly made.

The push button 150 and the first toothed portion 151 provided in the push button 150 may only move in the upward and downward direction, that is, move in the vertically straight direction. Accordingly, when the first toothed portion 151 and the second toothed portion 131 are engaged as described above, the teeth of the first toothed portion 151 may press the second toothed portion 131 in the downward direction and rotate the second toothed portion 131 in the circumferential direction of the push button 150.

In the process of the teeth of the teeth of the first toothed portion 151 pressing to move the second toothed portion 131 in the downward direction, the second toothed portion 131 may move along an inclined surface of the first toothed portion 151. At this time, the second toothed portion 131 may move in the circumferential surface of the push button 150, while moving along the inclined surface of the first toothed portion 151.

Accordingly, the locking protrusion 130 located on the first fixing protrusion 141 may move toward the second fixing protrusion 142. The locking protrusion 130 located on the second fixing protrusion 142 may move toward the first fixing protrusion 141.

Specifically, when the pressing manipulation for the push button 150 is repeated, the engagement and disengagement between the first toothed portion 151 and the second toothed portion 131 may be repeated and the movement of the locking protrusion 130 in the circumferential direction of the push button 150 may be naturally induced. The engagement target with the locking protrusion 130 may be smoothly changed from the first fixing protrusion 141 to the second fixing protrusion 142 and from the second fixing protrusion 142 to the first fixing protrusion 141 by the movement of the locking protrusion 130.

In addition, the locking mechanism 100 may further include an elastic member 160. The elastic member 160 may be provided to elastically support the shaft 120 in a direction in which the engaging protrusion 140 and the locking protrusion 130 are engaged.

As one example, the elastic member 160 may be formed in a coil spring installed in the holder 110. A lower end of the elastic member 160 may be supported by the lower end of the first holder and an upper end thereof may be engaged with the locking protrusion 130. The elastic member 160 may elastically support the shaft in the upward direction, so that the upper surface of the locking protrusion 130 can engage with the lower surface of the engaging protrusion 140.

According to the locking mechanism 100 having the above-described configuration, the shaft 120 may be fixed at the fixing position Pa when the locking protrusion 130 and the engaging protrusion 140 are engaged with each other at the first position P1. The locking protrusion 130 may be engaged with the first fixing protrusion 141 at the first position P1. At this time, the shaft 120 may be fixed at the fixing position Pa to be coupled to the hinge member 30.

In addition, according to the locking mechanism 100 having the above-described configuration, when the push button 150 engaged with the engaging protrusion 140 are engaged with the locking protrusion 130 at the second position P2, the shaft 120 may be fixed at the releasing position Pb. The locking protrusion 130 may be engaged with the push button 150 at the second position P2. At this time, the shaft 120 may be fixed at the released position Pb and maintain the separated state from the hinge member 30.

Installation Structure of Locking Member

Figure 8:
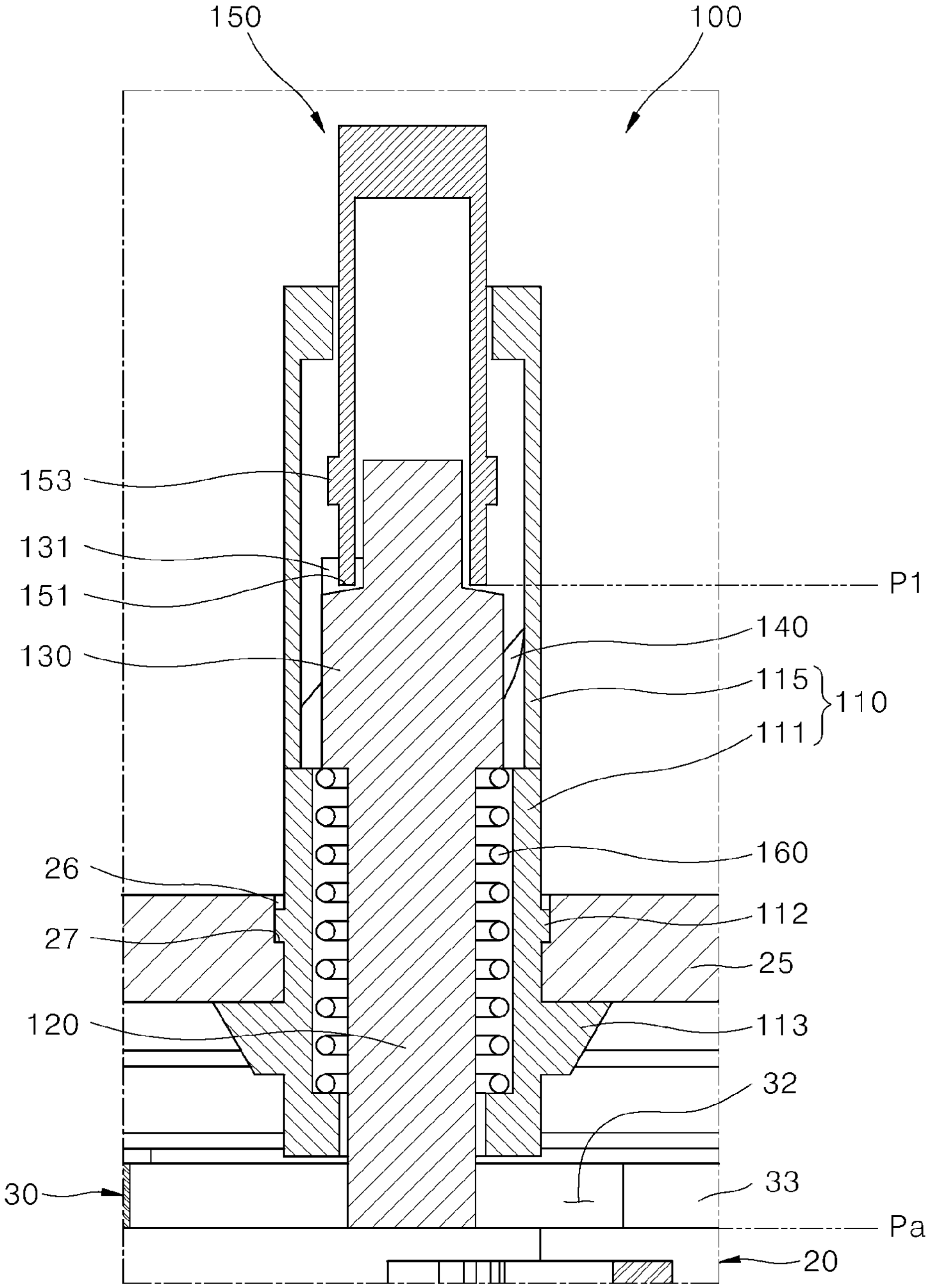
FIG. 8 is a sectional view of FIG. 3 along "VIII-VIII"

FIG. 8 is a sectional view along "VIII-VIII" shown in FIG. 3. Referring to FIGS. 5 to 8, an installation hole 26 may be provided in the upper surface of the door 20. The installation hole 26 may vertically penetrate the door, specifically, the upper surface of the door frame 25. The holder 110 of the locking mechanism 100, specifically, the first holder 111 may be inserted in the installation hole 26.

In this example, the first holder 111 may be inserted in the installation hole 26 and then fitted to the door 20, so that the locking mechanism 100 may be coupled to the door 20. Accordingly, the locking mechanism 100 may be coupled to the upper portion of the door 20. The coupling between the locking mechanism 100 and the door 20 may facilitate the integral movement of the locking mechanism 100 and the door 20 in the rotational direction of the door 20.

A projected portion 27 may be provided in the inner circumferential surface of the door 20. In this embodiment, the projected portion 27 may be provided in the door frame 25. The projected portion 27 may be provided in the inner circumferential surface of the door 20 that surrounds the installation hole 26. The projected portion 27 may be disposed between the upper surface of the door 20 and the hinge member 30, in a state of being exposed to the installation hole 26.

The holder 110 may further include a first protrusion 112 and a second protrusion 113. The first protrusion 112 and the second protrusion 113 may each be protruded from the outer circumferential surface of the first holder 111. The first and second protrusions 112 and 113 may be spaced apart from each other in the vertical direction.

In this example, the projected portion 27 provided in the inner circumferential surface of the door 20 may be fitted between the first protrusion 112 and the second protrusion 113, so that the fitting coupling between the door 20 and the first holder 111 may be made. The vertical movement of the first holder may be restricted by the fitting between the door 20 and the first holder 111.

The first protrusion 112 may be provided over the second protrusion 113 and protruded from the outer circumferential surface of the first holder 111 in the centrifugal force direction. A lower end of the first protrusion 112 may interfere with an upper surface of the projected portion 27, and the first protrusion 112 may be seated on the upper surface of the projected portion 27.

The second protrusion 113 may be disposed under the first protrusion 112, and may be formed in a hook-like shape having a lower part of an inclined surface. The second protrusion 113 may be inserted in the door 20 through the installation hole 26 and pass through the projected portion 27 from the upper area of the projected portion 27 to be disposed in the lower area thereof. As the lower area of the second protrusion 113 is formed as the inclined surface, the second protrusion 113 may easily and smoothly pass through the projected portion 27 along the inclined surface.

As described above, the second protrusion 113 may be disposed in the lower area of the projected portion 27 after passing through the projected portion 27. In a state where the first protrusion 112 is seated on the upper surface of the projected portion 27, the projected portion 27 may be fitted between the first protrusion 112 and the second protrusion 113. Accordingly, the fitting coupling between the door 20 and the first holder 111 may be made, so that the vertical movement of the holder 110 may be restricted, thereby stably installing the locking mechanism 100 in the door 100.

Fixing Structure of Locking Member

In the locking mechanism 100 installed as described above, the shaft 120 may be movable in the holder 110. At least predetermined part of the shaft 120 may be projected outside the holder 110 from the fixing position Pa to be coupled to the hinge member 30. Thus, the fixing position Pa may be provided higher than the releasing position Pb and the predetermined part of the shaft 120 may be projected toward the lower area of the holder from the fixing position Pa to be coupled to the hinge member 30.

The hinge member 30 may include a fixed portion 31 and a hinge portion 33.

The fixed portion 31 may be the portion of the hinge 30 that is fixed to the front surface of the main body 10. The fixed portion 31 may be formed of a metal plate having a plane parallel to the front plate 12. The fixed portion 31 may be coupled to the front plate 12 in front of the front plate 12 to be fixed to the front surface of the main body 10.

The hinge portion 33 may be the portion of the hinge member 30 that is coupled to the door 20. The hinge portion 33 may extend from the fixed portion 31 toward the door 20, that is, to the front of the door, and it may be formed of a metal plate having a plane parallel to the upper surface of the door 20. The hinge portion 33 may be formed in a shape of a metal plate having a plane orthogonal to the rotational axis of the door 20. The door 20 may be rotatably coupled to the hinge portion 33.

The hinge member 30 may further include a through-hole portion 32. The through-hole portion 32 may be provided between fixed portion 31 and a coupling portion between the hinge portion 33 and the door 20. The through-hole portion 32 may pass through the hinge member 30 in the vertical direction.

The through-hole portion 32 may form a passage for the shaft 120 on the hinge member 30 to pass the shaft through the hinge member 30 vertically. Accordingly, the predetermined part of the shaft 120 positioned at the fixed position Pa may pass the hinge member 30 through the through-hole portion 32 in the vertical direction.

As the at least a part of the shaft located at the fixing position Pa may interfere with a lateral surface of the hinge portion 33 opposite to the shaft 120, the locking between the shaft 120 and the hinge member 30 may be made and the movement of the shaft 120 along the rotation of the door 20 may be restricted. As the movement of the shaft 120 is restricted, the rotation of the door 20 having the locking mechanism 100 installed therein may be restricted.

Figure 9:
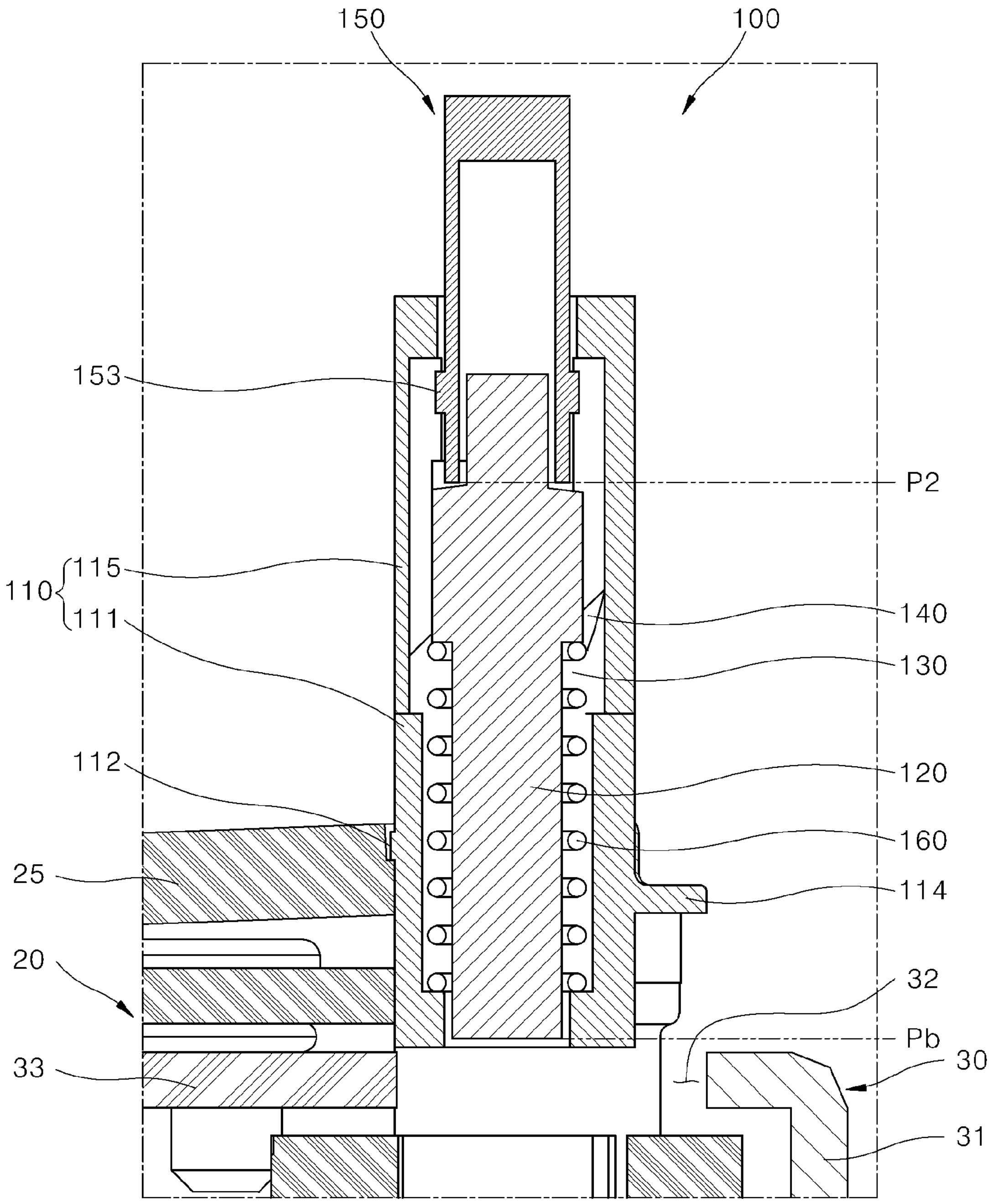
FIG. 9 shows a state where a shaft is located in a lock-releasing position in the locking mechanism according to one embodiment.
Figure 12:
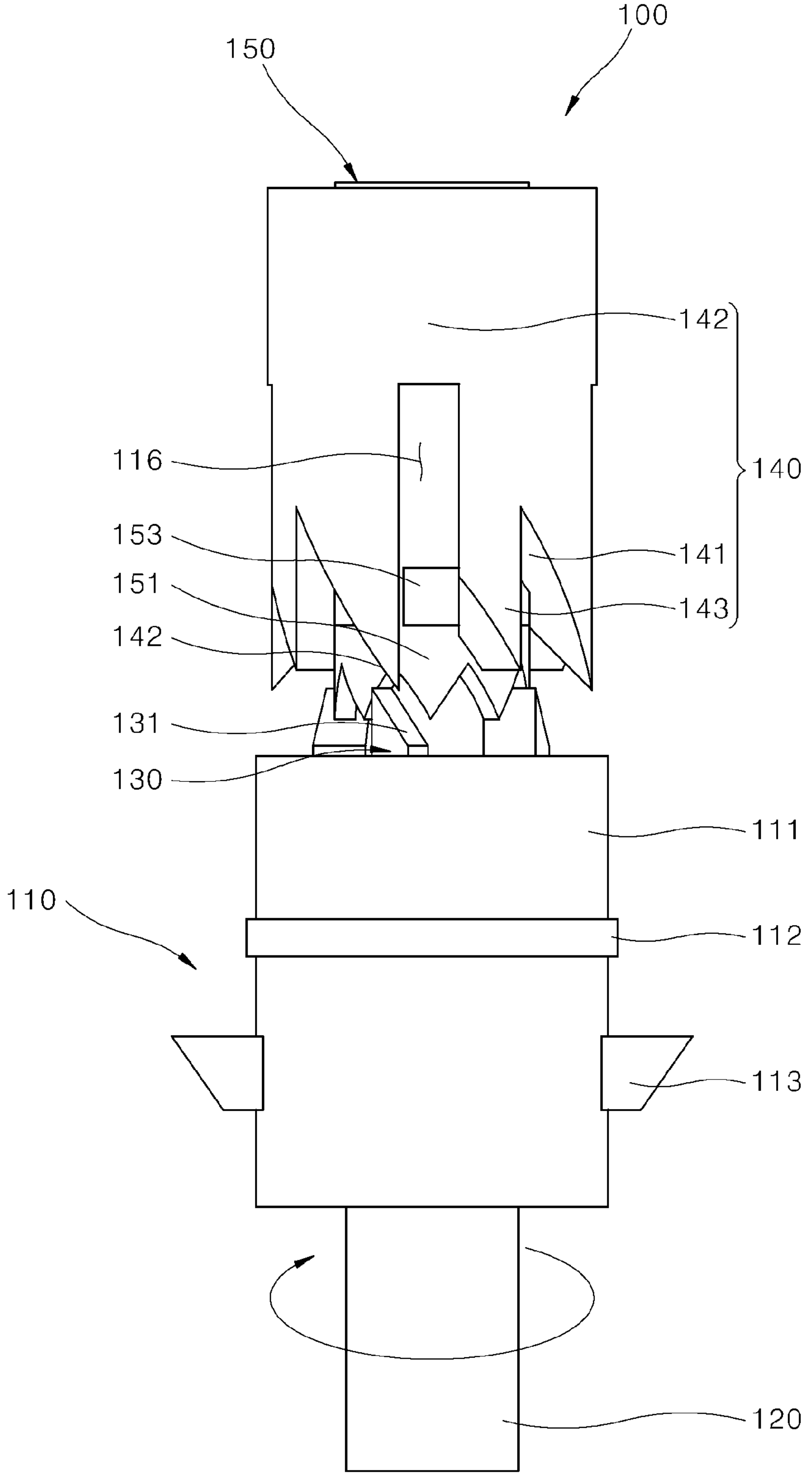
Figure 13:
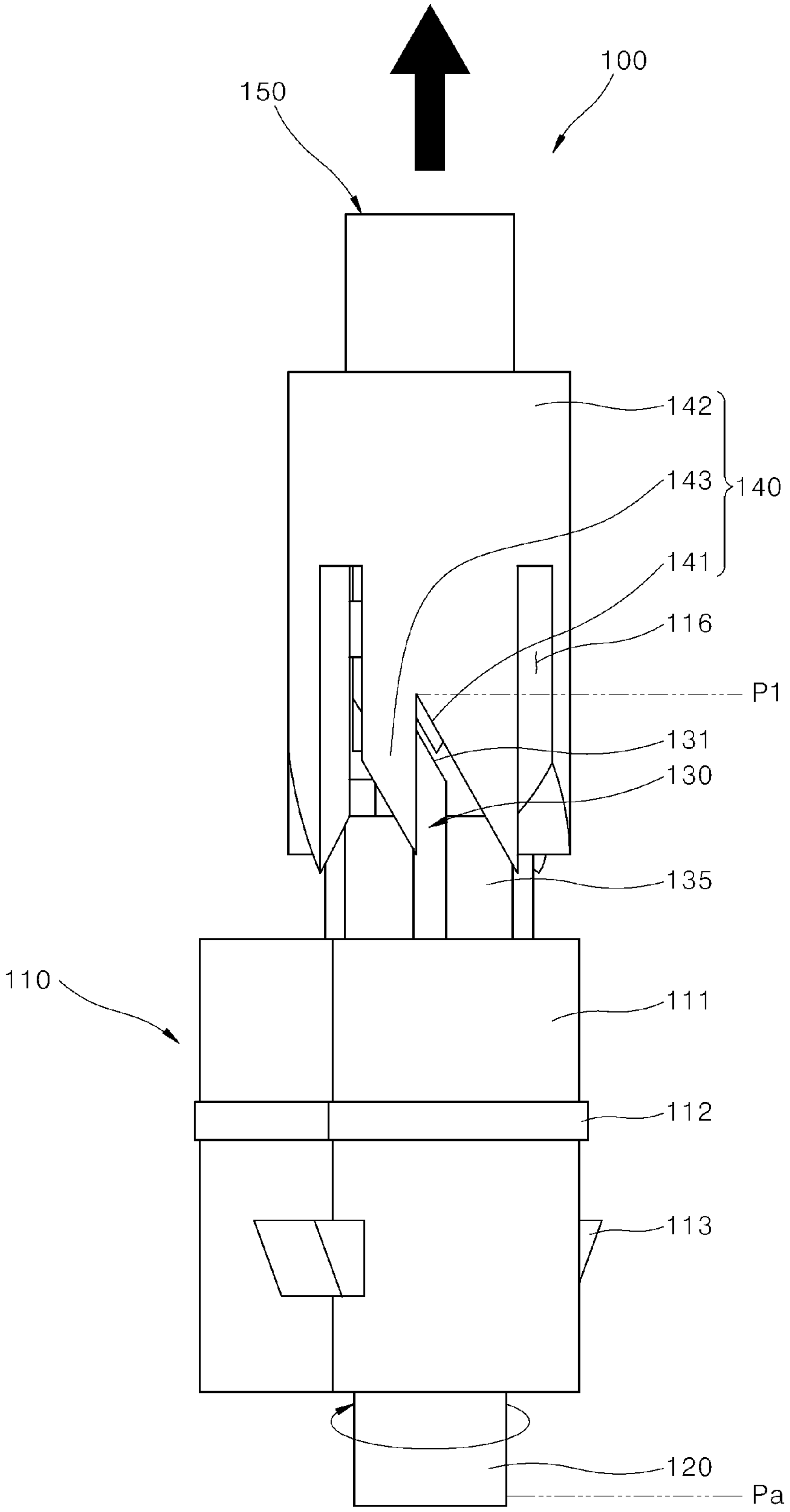
FIG. 13 shows a state where the shaft provided in the locking mechanism shown in FIG. 12 is located in a securing position.
Figure 14:
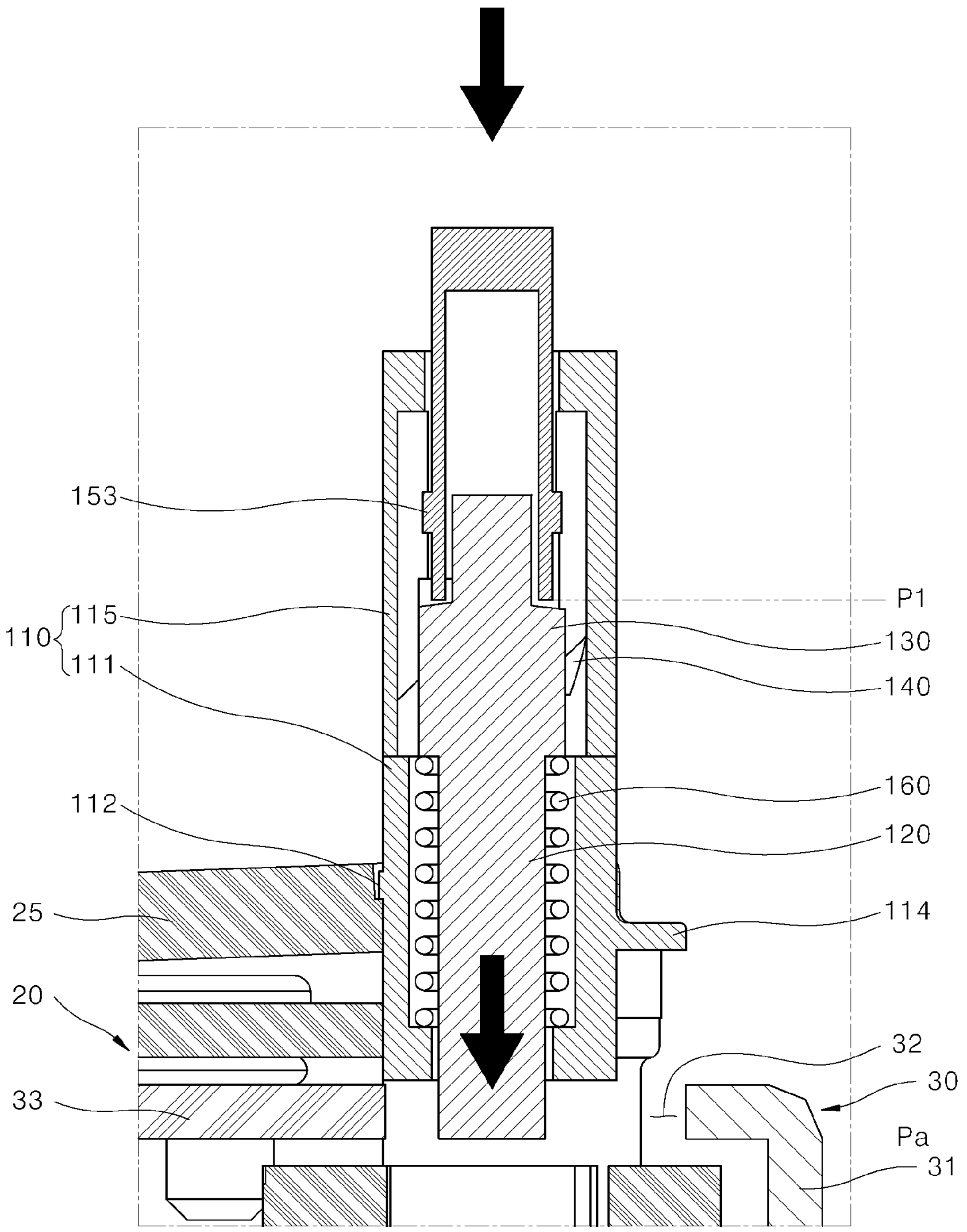
FIGS. 14 and 15 are sectional views showing a door locking state of the locking mechanism.
Figure 15:
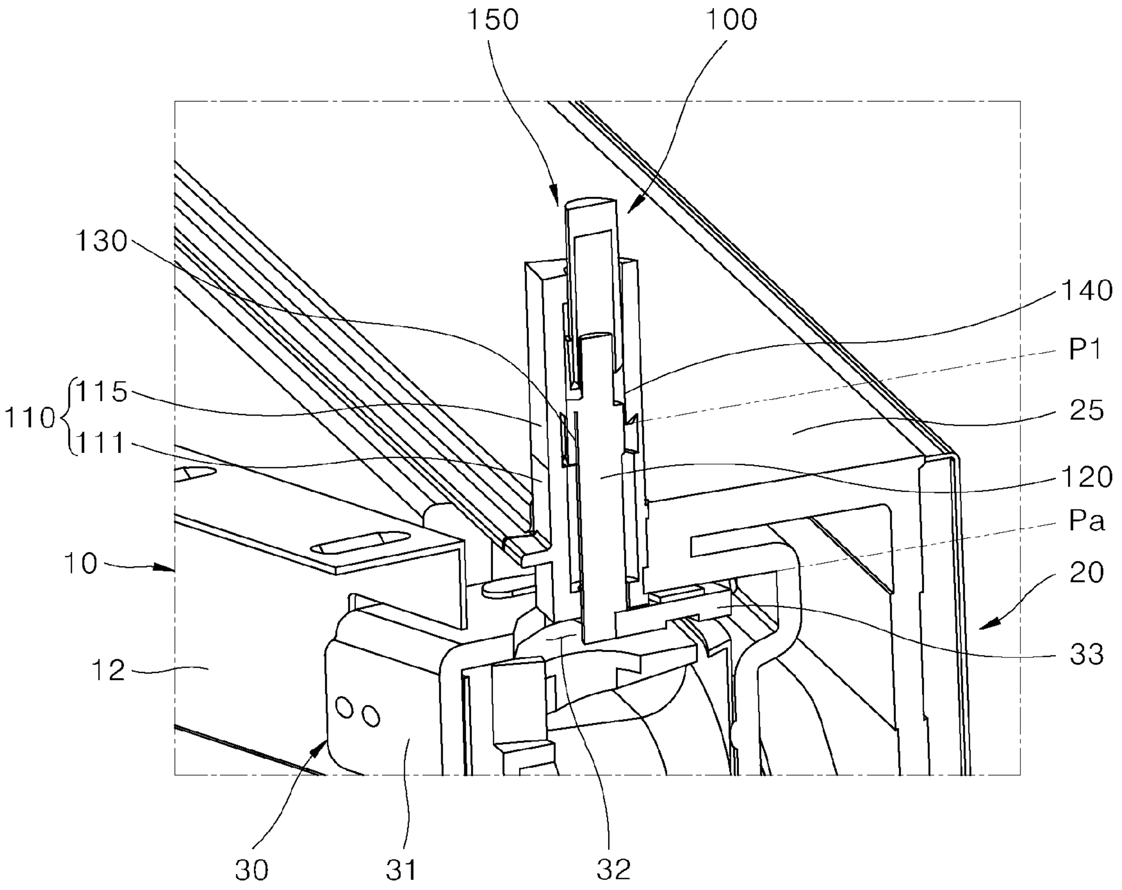

FIG. 10 shows a state where an engaging protrusion is engaging to a locking protrusion in the locking mechanism shown in FIG. 9. FIGS. 11 and 12 show a state where a manipulation of pushing a push button is performed in the locking mechanism shown in FIG. 10. FIG. 13 shows a state where the shaft provided in the locking mechanism shown in FIG. 12 is located in a securing position. FIGS. 14 and 15 are sectional views showing a door locking state of the locking mechanism.

Hereinafter, referring to FIGS. 9 to 15, the structure of the locking member for fixing the door will be described in detail. For convenience of description, it should be noted that the illustration of the second holder is omitted in FIGS. 10 to 13.

Referring to FIGS. 9 and 10, when the shaft 120 is located at the releasing position Pb in the locking mechanism 100, the lower end of the shaft 120 may be located higher than the door 20 and the hinge member 30, and the door 20 may be in a state of freely rotating to open and close the cooking chamber.

In this instance, the guide protrusion 153 of the push button 150 may be engaged with the second fixing protrusion 142 in a state of being inserted in the guide groove 116. Accordingly, the vertical position of the push button 150 may be fixed and the locking protrusion 130 projected from the outer circumferential surface of the shaft 120 may engage with the lower end of the push button, specifically, the teeth of the first toothed portion 151. Accordingly, the shaft 120 may maintain the fixed state at the released position Pb.

As shown in FIG. 11, when the pressing manipulation for the push button 150 is made, the shaft 120 may move in the downward direction and the engagement between the first toothed portion 151 and the second toothed portion 131 may be made.

When the first toothed portion 151 and the second toothed portion 131 engage with each other, the teeth of the first toothed portion 151 move the second toothed portion 131 and the locking protrusion 130 including the second toothed portion 131 in the circumferential direction of the push button 150, with pressing the second toothed portion 131 in the downward direction.

The locking protrusion 130 may be released from the engaged state with the second fixing protrusion 142 and moved toward the first fixing protrusion 141 by the movement of the locking protrusion 130. When the force applied to press the push button 150 in the state where the locking protrusion 130 is moved toward the first fixing protrusion 141, the shaft 120 and the locking protrusion 130 may be moved in the upward direction by the elasticity of the elastic member 160.

The locking protrusion 130 moving in the upward direction may move along the inclined surface of the first protrusion 141. At this time, the locking protrusion 130 may move in the circumferential direction of the push button 150 and engage with the first fixing protrusion 141 as shown in FIG. 13.

At this time, the locking protrusion 130 may engage with the first fixing protrusion 141 at the first position P1, so that the shaft 120 may be fixed at the fixing position Pa and restrict the movement of the door 20 in the rotational direction.

The locking mechanism 100 configured to restrict the movement of the door 20 in the rotational direction may fix the door 20 to the main body 10 to prevent the door 20 from opening the cooking chamber in the state where the door 20 has closed the cooking chamber or the door 20 from opening the cooking chamber after rotating by a predetermined angle or more.

As described above, the fixing of the door 20 that is closing the cooking chamber may be made with high reliability by the locking mechanism 100 configured to fix the door 20 to the main body 20. The cooking appliance according to the embodiments of the present disclosure including the locking mechanism 100 configured to fix the door may effectively prevent the unintentional opening of the cooking chamber during the operation of the cooking appliance.

When the pressing manipulation for the push button 150 is made in the state where the door 20 is fixed to the main body 10 by the locking mechanism 100, the shaft 120 may be moved in the downward direction. Together with that, the locking protrusion 130 may be released from the engaged state with the first fixing protrusion 141 at the first position P1 and moved in the downward direction, together with the shaft 120. During this process, the engagement between the first toothed portion 151 and the second toothed portion 131 may be made.

When the engagement between the first toothed portion 151 and the second toothed portion 131 may be made, the teeth of the first toothed portion 151 may press the second toothed portion 131 in the downward direction and move the second toothed portion 131 and the locking protrusion 130 including the second toothed portion 131 in the circumferential direction of the push button 150.

In the state where the locking protrusion 130 is moved to be located under the intermediate protrusion 143, the locking protrusion 130 may pass over the intermediate protrusion 143 and move toward the second fixing protrusion 142. Hence, when the force applied to press the push button 150 is removed in the state where the locking protrusion 130 is moved toward the second fixing protrusion, the shaft 120, the locking protrusion 130 and the push button 150 may be moved in the upward direction by the elasticity of the elastic member 160.

The guide protrusion 153 of the push button 150 moved in the upward direction may be moved in the upward direction along the passage guided by the guide groove 116, and then engaged with the second fixing protrusion 142. After that, the locking protrusion 130 may be engaged with the teeth of the first toothed portion 151. Accordingly, the shaft 120 may be fixed at the released position Pb and the door 20 may open and close the cooking chamber, without being affected by the locking mechanism 100.

As described above, the position of the shaft 120 may be changed to the fixed position Pa or the releasing position Pb only by repeating the pressing manipulation on the locking mechanism 100. The cooking appliance including the above-mentioned locking mechanism 100 may provide an effect of easily and conveniently fixing and releasing the door and also prevent the unintentional opening of the cooking chamber.

The locking mechanism 100 as described above may make it possible to easily and conveniently fix and release the door 20, thereby suppressing unnecessary opening and closing of the door frequently.

The cooking appliance according to the embodiment of the present disclosure including the locking mechanism 100 may effectively suppress the unstable opening and closing of the door 20 due to the abnormally rapidly worn latch mechanism.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A cooking appliance comprising:

a main body having a cooking chamber;

a hinge member disposed at a first lateral side of the main body;

a door rotatably coupled to the hinge member and configured to open and close the cooking chamber;

a latch mechanism provided in the door and configured to fix the door to the main body by engaging with the main body at a second lateral side of the main body; and a locking mechanism configured to fix the door to the main body at a different position from the latch mechanism, in a state where the cooking chamber is closed by the door fixed to the main body by the latch mechanism, wherein the locking mechanism provided in the door comprises a shaft configured to move to a fixing position, at which the shaft is coupled to the hinge member, or a releasing position, at which the shaft is released from the coupling state, by a user's pressing manipulation of the locking mechanism, wherein the locking mechanism comprises, a holder provided in the door, the holder comprising a predetermined space to accommodate the shaft;

a locking protrusion protruded toward an inner circumferential surface of the holder from an outer circumferential surface of the shaft opposite to the inner circumferential surface of the holder; and an engaging protrusion provided in the inner circumferential surface of the holder and configured to engage with the locking protrusion at a first position or a second position, and when the engaging protrusion engages with the locking protrusion at the first position, the shaft is fixed at the fixing position, and when the engaging protrusion engages with the locking protrusion at the second position, the shaft is fixed at the releasing position, wherein the locking mechanism further comprises, a push button movably provided in the holder and configured to move the shaft based on the user's pressing manipulation to move the locking protrusion to the first position or the second position, wherein the holder comprises, a first holder accommodating a first portion of the shaft and coupled to the door, the first holder having a lower portion that is open toward the hinge member; and a second holder provided above the first holder and coupled to the first holder, the second holder accommodating a second portion of the shaft and a predetermined area of the push button, the second holder having the engaging protrusion, wherein the engaging protrusion comprises, a first fixing protrusion that is protruded from an inner circumferential surface of the second holder to engage with the locking protrusion at the first position in a vertical direction; and a second fixing protrusion that is protruded from the inner circumferential surface of the second holder to engage with the locking protrusion at the second position in a vertical direction, wherein the first fixing protrusion and the second fixing protrusion are alternately disposed in a circumferential direction of the second holder.

2. The cooking appliance of claim 1, wherein the push button engaging with the second fixing protrusion in the vertical direction engages with the locking protrusion and the locking protrusion is fixed at the second position in the process of the vertical engagement between the push button and the locking protrusion, and vertical positions of the first position and the second position are different from each other.

3. The cooking appliance of claim 2, wherein the push button comprises a guide protrusion that is protruded from an outer circumferential surface of the push button opposite to the second holder in a centrifugal force direction, the second holder comprises a guide groove provided under the second fixing protrusion and recessed from an inner circumferential surface of the second holder in a centrifugal force direction, the guide groove being configured to guide vertical movement of the guide protrusion engaging with the guide groove.

4. The cooking appliance of claim 3, wherein the second fixing protrusion provided over the guide groove interferes with the guide protrusion to fix the vertical position of the push button, and the vertical position of the locking protrusion is fixed at the second position when a lower end of the push button is engaged with an upper end of the locking protrusion in the vertical direction.

5. The cooking appliance of claim 1, wherein an installation hole is vertically provided through an upper surface of the door to accommodate the holder therein, the holder is accommodated in the installation hole and fitted to the door, thereby coupling the door to the locking mechanism, and the locking mechanism is coupled to the upper area of the door and configured to integrally move with the door in the rotational direction of the door.

6. A cooking appliance comprising:

a main body having a cooking chamber;

a hinge member disposed at a first lateral side of the main body;

a door rotatably coupled to the hinge member and configured to open and close the cooking chamber;

a latch mechanism provided in the door and configured to fix the door to the main body by engaging with the main body at a second lateral side of the main body; and a locking mechanism configured to fix the door to the main body at a different position from the latch mechanism, in a state where the cooking chamber is closed by the door fixed to the main body by the latch mechanism, wherein the locking mechanism provided in the door comprises a shaft configured to move to a fixing position, at which the shaft is coupled to the hinge member, or a releasing position, at which the shaft is released from the coupling state, by a user's pressing manipulation of the locking mechanism, wherein the locking mechanism comprises, a holder provided in the door, the holder comprising a predetermined space to accommodate the shaft;

a locking protrusion protruded toward an inner circumferential surface of the holder from an outer circumferential surface of the shaft opposite to the inner circumferential surface of the holder; and an engaging protrusion provided in the inner circumferential surface of the holder and configured to engage with the locking protrusion at a first position or a second position, and when the engaging protrusion engages with the locking protrusion at the first position, the shaft is fixed at the fixing position, and when the engaging protrusion engages with the locking protrusion at the second position, the shaft is fixed at the releasing position, wherein an installation hole is vertically provided through an upper surface of the door to accommodate the holder therein, the holder is accommodated in the installation hole and fitted to the door, thereby coupling the door to the locking mechanism, and the locking mechanism is coupled to the upper area of the door and configured to integrally move with the door in the rotational direction of the door, wherein a projected portion is provided between the upper surface of the door and the hinge member, the protected portion being exposed from an inner circumferential surface of the door surrounding the installation hole toward the installation hole, the holder further comprises a first protrusion and a second protrusion that are each protruded from an outer circumferential surface of the holder, and the projected portion is fitted between the first protrusion and the second protrusion that are spaced apart from each other in the vertical direction and the vertical movement of the holder is restricted.

7. The cooking appliance of claim 6, wherein the second protrusion is disposed under the first protrusion and formed in a hook-like shape having a lower inclined surface.

8. The cooking appliance of claim 1, wherein the locking mechanism further comprises an elastic member configured to elastically support the shaft in a direction which the engagement between the engaging protrusion and the locking protrusion is made.

9. The cooking appliance of claim 1, wherein the shaft is movable in the holder, and at least portion of the shaft protrudes outside the holder at the fixing position to be coupled to the hinge member.

10. A cooking appliance comprising:

a main body having a cooking chamber;

a hinge member disposed at a first lateral side of the main body;

a door rotatably coupled to the hinge member and configured to open and close the cooking chamber;

a latch mechanism provided in the door and configured to fix the door to the main body by engaging with the main body at a second lateral side of the main body; and a locking mechanism configured to fix the door to the main body at a different position from the latch mechanism, in a state where the cooking chamber is closed by the door fixed to the main body by the latch mechanism, wherein the locking mechanism provided in the door comprises a shaft configured to move to a fixing position, at which the shaft is coupled to the hinge member, or a releasing position, at which the shaft is released from the coupling state, by a user's pressing manipulation of the locking mechanism, wherein the locking mechanism comprises, a holder provided in the door, the holder comprising a predetermined space to accommodate the shaft;

a locking protrusion protruded toward an inner circumferential surface of the holder from an outer circumferential surface of the shaft opposite to the inner circumferential surface of the holder; and an engaging protrusion provided in the inner circumferential surface of the holder and configured to engage with the locking protrusion at a first position or a second position, and when the engaging protrusion engages with the locking protrusion at the first position, the shaft is fixed at the fixing position, and when the engaging protrusion engages with the locking protrusion at the second position, the shaft is fixed at the releasing position, wherein the shaft is movable in the holder, and at least portion of the shaft protrudes outside the holder at the fixing position to be coupled to the hinge member, wherein the shaft is coupled to the hinge member at a position spaced apart from the rotation center of the door in a centrifugal force direction.

11. The cooking appliance of claim 10, wherein the hinge member comprises, a fixed portion coupled to a front surface of the main body;

a hinge portion extending from the fixed portion toward the door and to which the door is rotatably coupled; and a through-hole portion provided between the fixed portion and a coupling point between the hinge portion and the door and vertically formed through the hinge member, wherein at least portion of the shaft located at the fixing position passes the hinge member through the through-hole portion.

12. The cooking appliance of claim 11, wherein the rotation of the door is restricted by the interference between at least portion of the shaft located at the fixing position and a lateral surface of the hinge portion opposite to the shaft.

* * * * *